United States Patent Office 3,291,843
Patented Dec. 13, 1966

3,291,843
FLUORINATED VINYL ETHERS AND THEIR PREPARATION
Charles Gerhard Fritz and Stanley Selman, Wilmington, Del., assignors to E. I. du Pont de Nemours and Company, Wilmington, Del., a corporation of Delaware
No Drawing. Filed Oct. 8, 1963, Ser. No. 314,651
14 Claims. (Cl. 260—614)

The present invention relates to the preparation of fluorinated ethers, and more particularly, to the preparation of perfluorinated vinyl ethers.

Partially fluorinated vinyl ethers have been made heretofore by a reaction involving an alkali metal alkoxide and a fluorinated ethylene. For example, trifluorovinyl ethers are prepared by the following reaction $$RONa + CF_2 = CF_2 \rightarrow R-O-CF=CF_2 + NaF$$

All of the known reactions for the preparation of halogenated vinyl ethers involve the use of an alcohol. The preparation of a completely fluorinated vinyl ether by these prior art methods would, therefore, require a completely fluorinated alcohol. It has, however, been established and is well known (see, for example, p. 137 of the ACS Monograph, "Aliphatic Fluorine Compounds," by Lovelace et al., published 1958) that completely fluorinated primary alcohols are inherently unstable and cannot be isolated. Hence, it is apparent that the prior art techniques for the preparation of trifluorovinyl ethers are not suitable for the preparation of perfluorinated vinyl ethers and vinyl ethers wherein the ether group is attached to a $CF_2$ group.

It is, therefore, the principal object of the present invention to provide a process for the preparation of perfluorinated vinyl ethers and vinyl ethers wherein the ether oxygen is attached to a $CF_2$ group. It is another object to provide a method for the preparation of novel ethers that cannot be prepared by other techniques. Other objects will become apparent hereinafter.

The objects of the present invention are achieved by a process wherein a perfluoro-2-alkoxy-propionyl fluoride is reacted at elevated temperatures with a thermally stable and solid oxygen-containing salt of an alkali or alkaline earth metal, that is, a metal selected from the group consisting of the Groups I-A and II-A of the Periodic Chart of the Elements such as may be found on pp. 448–9 of the "Handbook of Chemistry and Physics," 41st edition, 1959. Generally, the reaction is carried out at a temperature within the range 75 to 400° C. and preferably within the range 100 to 400° C. to achieve an optimum in yield and conversion to vinyl ether and a minimum in unwanted by-products, although with certain salts as will hereinafter be described the reaction preferably is conducted at 200 to 300° C., while with still other salts the reaction must be carried out at 250–300 to 400° C. Since the process of the present invention is based upon a metathetical or double decomposition reaction rather than a catalytic process, the oxygen-containing metal salt preferably should be finely divided to ensure intimate contacting of the reactants. Further, the quantity of the alkali or alkaline earth metal oxygen-containing salt usually is at least stoichiometric with the perfluoro-2-alkoxypropionyl fluoride, and it is preferable to use an excess of the salt to ensure maximum conversion of the acid fluoride. Although the salt may be present in quantities less than stoichiometric with the acid fluoride, this method of operation normally is not utilized since larger quantities of unconverted acid fluoride must be handled. While any convenient experimental method may be utilized to effect intimate contacting of the reactants, in one of the preferred processes the acid fluoride vapor is passed through a heated bed of the salt. In keeping therewith, the reactor preferably is constructed from a material which is inert to the reactants employed. Nickel and stainless steel are examples of structural materials which are useful herein. Moreover, the apparatus should be equipped with suitable means for temperature control to maintain the reaction temperature within the prescribed limits so as to minimize by-product formation. Especially suitable both for facilitating contacting of reactants and control of temperature is the use of a fluidized bed technique. Fluidization of the finely divided metal salt may be achieved by means of the vaporized propionyl fluoride alone or in combination with a carrier gas such as nitrogen. A second process for achieving intimate contacting of the substituted propionyl fluoride and the metal salt involves the use of a polar liquid phase. A significant feature of this method is that the reaction temperature may be substantially decreased from that employed in the anhydrous solid phase process. For example, when carrying out the reaction in a liquid phase, the process may be operated at 75° C. Preferably when employing this process, the temperature should be in the range 100 to 160° C. While the function of the polar liquid is not completely understood, the liquid undoubtedly exhibits a solvating influence on the reactants. Suitable herein are the ethylene glycol ethers, for example, the dialkyl ethers of ethylene glycol, diethylene glycol, or polyethylene glycol, dimethyl sulfoxide, N-methyl pyrrolidone, the hydrocarbon nitriles, N,N,-dialkyl amides, alkylaryl ketones and the like. Particularly preferred is the dimethyl ether of diethylene glycol. The polar liquids further may be described as those polar liquids which are capable of dissolving 0.01 weight percent of an alkali metal perfluoroalkoxide. As indicated hereinabove, the metal salt is a reaction temperature-thermally stable and solid, oxygen-containing salt of an alkali of alkaline earth metal. Preferred herein are the salts of the monovalent alkali metals. Suitable oxygen-containing salts include the carbonates, sulfates, sulfites, phosphates, phosphites, nitrates, nitrites, silicates and the like. Especially suitable herein are the carbonates and silicates of the monovalent aforesaid metals, with sodium carbonate being a particularly preferred carbonate and glass beads being a preferred source of a metal silicate. When a carbonate is employed in the metathetical reaction with the acid fluoride, it is preferable to conduct the process at 200 to 300° C. When silicates are used herein, the process must be carried out from about 275° C. to 400° C. and preferably at 300 to 400° C. While it is recognized in the art that fluorinated acid fluorides may be converted to metal salts and thence decarboxylated as a route to fluoroolefins, the process discovered as part of the present invention is unique in that it appears to proceed via the formation of an unusual anhydride-salt. Assuming such a mechanism to prevail, the reaction of a perfluorinated acid fluoride and sodium sulfate to form the salt of the perfluorinated acid may be represented by the following equation wherein $R_f$ is a perfluoroalkyl radical:

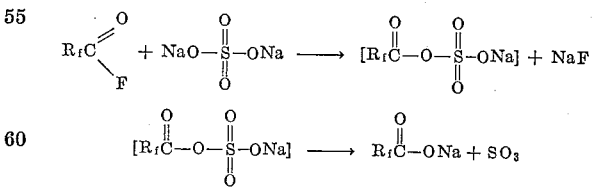

In the preferred process of the present invention utilizing sodium carbonate, the reaction may be postulated to proceed as follows:

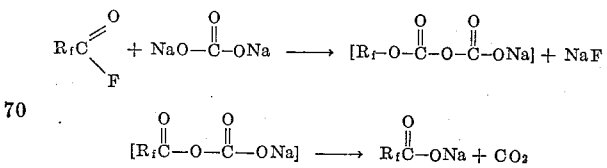

The oxygen-containing salts employed herein must be thoroughly dried before use inasmuch as moisture promotes competing side reactions which yield products such as hydrofluoroalkyl ethers. Reaction times in the present invention are determined principally by the anhydrous metal salt used and the desired conversion of the perfluoro-2-alkoxypropionyl fluoride. Generally, the reactants are contacted for 0.01 to 10 minutes, and preferably 1 to 60 seconds. Reaction times may be controlled quite effectively when using a bed type reactor by means of suitable gas flow-measuring devices for the input gaseous reactant and the carrier or dilution gas. Variation of the particle size of the metal salt in the bed offers a further means of regulating the contact time.

The perfluoro-2-alkoxypropionyl fluorides used in the present invention may be prepared by a variety of techniques. For example, a fluorinated acid fluoride may be reacted with hexafluoropropylene epoxide in the presence of a catalyst comprising activated carbon or a fluoride of an alkali metal, silver or quaternary ammonium radical, the fluoride catalyst being employed in combination with a strongly polar solvent such as a dialkyl ether of a mono- or polyalkylene glycol, or a hydrocarbon nitrile. Catalyst concentration is not critical. The amount of catalyst is determined by the environment in which the reaction is carried out. In general, the concentration of the catalyst is at least 0.01 weight percent of the hexafluoropropylene epoxide. Reaction temperatures may be varied over the range −80 to 200° C., although the preferred range is −30 to 100° C. Pressures ranging from below atmospheric pressure to several hundred atmospheres may be utilized since it has been established that pressure is not critical. Pressures usually are determined by the physical properties of the reagents. For example, the pressure necessary to maintain a liquid phase will be employed when it is desirable to maintain a liquid phase during the reaction. The fluorinated acid fluorides which are reacted with the hexafluoropropylene epoxide to form the perfluoro-2-alkoxypropionyl fluoride in the process of the present invention may vary widely in their structure. Thus, suitable alkanoic acid fluorides include carbonyl fluoride, perfluoroacetyl fluoride, perfluoropropionyl fluoride, perfluorobutyryl fluoride, perfluorododecanoyl fluoride perfluoroisobutyryl fluoride and similar perfluoroalkanoyl fluorides. Although the aforesaid exemplified acid fluorides which are reacted with hexafluoropropylene epoxide to yield the 2-alkoxypropionyl fluorides useful in the present invention have been described as perfluorinated acid fluorides, non-perfluorinated acid fluorides, also, may be employed herein as a reactant with the hexafluoropropylene epoxide, in which case the ultimate product vinyl ether will be non-perfluorinated. For example, omega-hydroperfluoroalkyl acid fluorides having the formula $HC_nF_{2n}COF$, wherein $n$ indicates the number of carbon atoms in the alkyl group attached to the acid fluoride group, may be reacted with the epoxide to yield a perfluoro-2-(omega-hydroperfluoroalkoxy)propionyl fluoride which then may be converted to an omega-hydroperfluoroalkyl perfluorovinyl ether by the process of this invention. It is also possible to employ dicarboxylic acid fluorides which, by the process of the present invention, lead to novel perfluorinated divinyl ethers with two ether linkages in the molecule. Examples of such alkandioic acid fluorides are the diacid fluorides of perfluoro-oxalic acid, -malonic acid, -succinic acid, -glutaric acid, -adipic acid, -pimelic acid, -suberic acid, -azelaic acid, and -sebacic acid. In another method for the preparation of perfluoro-2-alkoxypropionyl fluorides, hexafluoropropylene epoxide may be polymerized, in the absence of the aforesaid fluorinated acid fluoride, employing catalysts and reaction conditions as described above. When hexafluoropropylene epoxide is utilized, the product may be either a perfluoro-2-propoxypropionyl fluoride or a perfluoro-2-polypropoxypropionyl fluoride depending upon whether two, or more than two, hexafluoropropylene epoxide units participate in the reaction. Still another method for the preparation of perfluoro-2-alkoxypropionyl fluorides is a two-stage process wherein a fluorinated acid fluoride is reacted with tetrafluoroethylene epoxide to yield a perfluoro-2-alkoxyacetyl fluoride or a perfluoro-2-polyalkoxyacetyl fluoride which then is converted to the propionyl fluoride by reaction with hexafluoropropylene epoxide. Once again, the catalysts and reaction conditions previously described may be utilized, and again, non-perfluorinated acid fluorides, also, may be reacted with the tetrafluoroethylene epoxide. As is obvious from the above, the only prerequisite for the perfluorinated starting material in the present invention is that it must have at least one perfluoro-2-alkoxypropionyl fluoride end group. Although not necessarily limited thereto, the propionyl fluoride derivatives useful in the preparation of the vinyl ethers of the present invention include those represented by the following formulae:

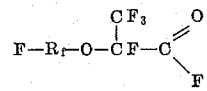

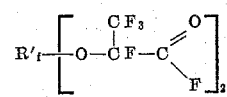

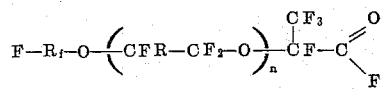

and

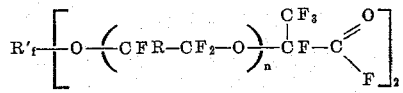

wherein $R_f$ is a perfluoroalkylene radical having 1 to 12 carbon atoms, $R'_f$ is a perfluoroalkylene radical having 2 to 12 carbon atoms, $n$ is an integer from 1 to 20 and R is either a fluorine or a trifluoromethyl radical. Examples of perfluoro-2-alkoxypropionyl fluorides which are suitable for use in the present invention include perfluoro-2-methoxypropionyl fluoride,
perfluoro-2-ethoxypropionyl fluoride,
perfluoro-2-propoxypropionyl fluoride,
perfluoro-2-isopropoxypropionyl fluoride,
perfluoro-2-butoxypropionyl fluoride,
perfluoro-2-isobutoxypropionyl fluoride,
perfluoro-2-(beta-ethylpropoxy)propionyl fluoride,
perfluoro-2-(cyclobutylmethoxy)propionyl fluoride,
perfluoro-2-heptoxypropionyl fluoride,
perfluoro-2-octoxypropionyl fluoride,
perfluoro-2-dodecoxypropionyl fluoride,
perfluoro-2,5-dimethyl-3,6-dioxanonanoyl fluoride,
perfluoro-2,7-dimethyl-3,6-dioxasuberyl fluoride,
perfluoro-2,10-dimethyl-3,9-dioxaundecanedioyl fluoride,
perfluoro-2,5,8-trimethyl-3,6,9-trioxalauroyl fluoride,
and the like.

The following examples are given to demonstrate and not necessarily limit the process of the present invention.

*Example I*

A dry 30 ml. stainless steel cylinder is charged with 1 g. of previously dried (heated 20 hrs. at 400° C. in vacuo) "Darco," commercially available activated carbon, and is cooled to −180° C. and evacuated. There are then introduced 8.7 g. of hexafluoropropylene epoxide and 8.7 g. of pentafluoropropionyl fluoride. The mixture is slowly warmed to room temperature and kept at room temperature for 2 days. On work-up, there are obtained 7.8 g. of perfluoro-2-propoxypropionyl fluoride having a boiling point of 55 to 57° C. Both epoxide and perfluoropropionyl fluoride are recovered in nearly equal amounts indicating that the product is formed by interaction of acid fluoride and epoxide.

The perfluoro-2-propoxypropionyl fluoride is dehalocarbonylated by passage through a bed of dry potassium sulfate pellets at 300° C. with a contact time of 10 minutes. The major product isolated is perfluoropropyl perfluorovinyl ether, B.P. 35 to 36° C.

*Example II*

Perfluoro-2-methoxypropionyl fluoride is prepared by the reaction of hexafluoropropylene epoxide with carbonyl fluoride in the presence of "Darco" activated carbon. A 33% conversion to perfluoro-2-methoxypropionyl fluoride having a boiling point of 10 to 12° C. is obtained. The nuclear magnetic resonance and infrared spectra are consistent with the assigned structure. The resulting product is dehalocarbonylated by passage through a bed of dry potassium sulfate pellets at 300° C. with a contact time of 10 minutes. A 60% yield of perfluoromethyl perfluorovinyl ether having a boiling point of −22° C. is obtained. Infrared and nuclear magnetic resonance spectra are consistent with the assigned structure.

A similar result is obtained when the perfluoro-2-methoxypropionyl fluoride is converted to a monovalent metal salt of the acid and then pyrolyzed.

*Example III*

Into a platinum tube 6″ x 0.5″ sealed at one end is charged 0.55 g. of "Darco" activated carbon. The tube is evacuated, heated to 600° C., cooled and charged with 3.4 g. of perfluoroacetyl floride and 3.4 g. of hexafluoropropylene epoxide. After sealing, the reaction mixture is maintained at −15° C. for 48 hours. On opening, there is obtained an 89% yield, based on hexafluoropropylene epoxide, of perfluoroethoxypropionyl fluoride, B.P., 30 to 33° C. The nuclear magnetic resonance and infrared spectra of the product are consistent with the assigned structure. The resulting perfluoroethoxypropionyl fluoride is pyrolyzed to perfluoroethyl perfluorovinyl ether, B.P., about 8° C., by pyrolysis at a temperature of 300° C. over sodium sulfate.

*Example IV*

Into a 320 ml. stainless steel reaction vessel are charged 11.6 g. of cesium fluoride and 20 ml. of diethylene glycol dimethyl ether. The vessel is cooled to −80° C. and evacuated. There are then added 60 g. of perfluoroisobutyryl fluoride and 43 g. of hexafluoropropylene epoxide. The bomb is heated to 100° C. for 4 hours. Distillation of the liquid product affords 10 g. of perfluoro-2-isobutoxypropionyl fluoride, boiling point, 76 to 78° C. An infrared spectrum of the product is consistent with the assigned structure. A substantially similar result is obtained when the cesium fluoride is replaced with silver fluoride or tetramethyl ammonium fluoride.

The perfluoro-2-isobutoxypropionyl fluoride is converted to perfluoroisobutyl perfluorovinyl ether, B.P., about 56° C., in accordance with the procedure of Example I.

*Example V*

A 2.5 x 40 inch stainless steel tubular reactor having a sintered metal plug at its exit end is placed in a 20 inch split tube furnace. Suitable thermocouples with sensing ends positioned in the reactor are utilized in conjunction with conventional recorders and relays to control the thermal output of the furnace. The reactor is filled with a sodium silicate glass in the form of 3.2 kilograms of about 100 mesh shotted glass beads. Dry nitrogen is passed through the reactor at a rate of 2 liters/minute to fluidize the bed while the temperature is brought to 390° C. The nitrogen flow is replaced with vaporized perfluoro-2-methoxypropionyl fluoride. The temperature is maintained at 390±10° C. and fluidization is continued as the propionyl fluoride is passed through the bed at a rate of 1 kilogram/hour. Conversion of the fluoride is 90%. Gas exiting the reactor is scrubbed with caustic solution to remove carbon dioxide and silicon tetrafluoride, then cooled with Dry Ice to condense the fluorinated products. Employing a distillative separation, perfluoromethyl perfluorovinyl ether is obtained in 95% yield.

*Example VI*

Example V is repeated employing in place of perfluoro-2-methoxypropionyl fluoride either perfluoro-2-propoxypropionyl fluoride or perfluoro-2,8-dimethyl-3,7-dioxaazelayl fluoride. Further, instead of vaporizing the fluoride directly into the bed, it is dropped on a separate bed of glass beads which are heated to about 250° C. and flashed into a nitrogen stream. The mixture of nitrogen and acid fluoride then is passed into the reactor. Employing the aforesaid fluorides, at conversions of about 60% and 90%, respectively, the vinyl ethers recovered at yields of about 85% and 40%, respectively, are either perfluoropropyl perfluorovinyl ether, B.P. 35 to 36° C., or perfluorotrimethylene glycol bis(perfluorovinyl ether), B.P. 91 to 92° C.

*Example VII*

A glass tubular reactor 1.75 inches in diameter, 12 inches in length, having a coarse fritted glass disc at one end and containing suitable thermocouples to permit uniform heating over its entire length by means of a tubular furnace is filled to about one half its volume with 200–325 mesh glass "Microbeads." The bed is heated to 320° C. and fluidized with a stream of dry nitrogen flowing at a rate of 170 cc./minute. Into the nitrogen stream are introduced 10.9 grams of perfluoro-2,8-dimethyl-3,7-dioxaazelayl fluoride. This is effected by dropping the acid fluoride on a bed of hot ¼ inch glass beads which is in series with the reactor and through which the nitrogen is passed prior to entry into the reactor. The gas exiting the reactor is scrubbed with caustic solution to remove carbon dioxide and silicon tetrafluoride, then cooled with Dry Ice to condense the fluorinated products. Employing gas chromatographic techniques for separating the products, there is recovered 0.8 gram of unconverted acid fluoride, 3.4 grams of perfluorotrimethylene glycol bis(perfluorovinyl ether), boiling point 90° C., and 0.3 gram of the monovinyl ether perfluoro-2-methyl-3,7-dioxanon-8-enoyl fluoride. Infrared and nuclear magnetic resonance spectra for the divinyl ether are consistent with the structure assigned.

*Example VIII*

A glass tubular reactor 2.0 cm. in diameter (I.D.), 50 cm. in length and having a coarse fritted glass disc at one end is positioned in a tubular furnace and adapted so as to permit uniform heating over its entire length. The tube is filled with 148 grams (140 ml.) of ⅛ inch sodium carbonate pellets. The bed is dried by heating to 300° C. and passing a stream of nitrogen (500 cc./minute at standard conditions) through the bed for 18 hours, after which time the moisture content of the sodium carbonate is less than 6 parts/million. The nitrogen is replaced with a stream of perfluoro-2-propoxypropionyl fluoride (50 cc./minute at standard conditions) and the crude product is collected in Dry Ice, acetone-cooled traps. Distillatively separated from the crude product is perfluoropropyl perfluorovinyl ether, boiling point, 35 to 36° C.

*Example IX*

Example VIII is repeated except that lithium carbonate is employed in place of sodium carbonate. A comparable conversion and yield of perfluoropropyl perfluorovinyl ether are obtained.

*Example X*

Example VIII is repeated except that potassium carbonate is employed in place of sodium carbonate. A comparable conversion and yield of perfluoropropyl perfluorovinyl ether are obtained.

Example XI

Example VIII is repeated except that sodium tetraborate is employed in place of sodium carbonate. A comparable conversion and yield of perfluoropropyl perfluorovinyl ether are obtained.

Example XII

Example VIII is repeated except that calcium carbonate is employed in place of sodium carbonate. Although perfluoropropyl perfluorovinyl ether is recovered as the principal product, the conversion and yield are less than those achieved in Example VIII indicating that the alkaline earth metal oxygen-containing salts are inferior to the monovalent alkali metal oxygen-containing salts in the present invention.

Example XIII

Into a suitably adapted, glass, reaction vessel are placed 42.5 grams of anhydrous sodium carbonate and 75 ml. of anhydrous diethylene glycol dimethyl ether. To the stirred slurry are added 96 grams of perfluoro-2-propoxypropionyl fluoride. Within a few minutes a slow exotherm occurs, with the temperature rising to about 60° C. The perfluoro-2-propoxypropionyl fluoride distillatively removed from the reaction flask during the exotherm is collected in a cold trap and returned to the reaction flask. The mixture is then heated to 140° C. for 30 minutes after which time reaction is complete. The crude product is distillatively purified and yields perfluoropropyl perfluorovinyl ether, boiling point, 35 to 36° C. The conversion for this reaction is 98.2 percent while the yield is 99.0 percent.

Example XIV

Example XIII is repeated except that lithium carbonate is employed in place of sodium carbonate. The conversion in this reaction is 99.7 percent while the yield is 94.5 percent.

Example XV

Example XIII is repeated except that potassium carbonate is employed in place of sodium carbonate. At a conversion of 96.3 percent, perfluoropropyl perfluorovinyl ether is recovered, with the yield being 97.0 percent.

Example XVI

Example XIII is repeated except that dimethyl formamide is employed in place of diethylene glycol dimethyl ether. At a conversion of 99.6 percent, the yield of perfluoropropyl perfluorovinyl ether is 62.8 percent.

Example XVII

Example XIII is repeated except that acetophenone is employed in place of diethylene glycol dimethyl ether. At a conversion of 98.5 percent, perfluoropropyl perfluorovinyl ether is recovered, with the yield being 14.6 percent.

Example XVIII

Into a glass vessel equipped with stirrer, nitrogen inlet and an outlet leading to a glass receiver were placed 200 ml. of benzonitrile, 20 ml. of benzene and 126 g. of the dipotassium salt of perfluoro-2,10-dimethyl-3,9-dioxaundecanedioic acid. The reaction mixture was heated to 130 to 150° C. for 5 hours. Distillation of the condensate afforded 36.5 g. of perfluoropentamethylenebis(perfluorovinyl ether). While this example demonstrates the use of a polar solvent as a means of carrying out the reaction at a lower temperature, the time used herein is not necessarily indicative of the times normally employed when the process of the present invention is carried out in the presence of a polar liquid phase. While the time of reaction normally employed is greater than the 0.1 to 10 minute range utilized for the dry solid phase reaction, contact times of 10 to 20 minutes in the liquid phase often are adequate. Preferred time limits are 20 to 30 minutes and seldom is it necessary to exceed one hour.

The process of the present invention has been demonstrated by the foregoing examples which, however, are not intended to limit the scope of the invention. For example, while the process of the present invention, as has been described and exemplified hereinabove, employs a perfluoro-2-alkoxypropionyl fluoride, it has been found that a perfluoro-2-alkoxy-propionyl chloride, likewise, may be used as a reactant. In this case, however, it is believed that at least a part of the acid chloride is converted to the acid fluoride during the reaction and thence is converted to the vinyl ether by the same mechanism as when the acid fluoride is used as the starting material. The process described is especially useful for the preparation of perfluorinated vinyl ethers which may be homopolymerized or copolymerized with other ethylenically unsaturated compounds. The divinyl ethers are of particular importance in obtaining cross-linkable perfluorocarbon resins. Particularly useful high molecular weight polymers are obtained by the copolymerization of the aforesaid vinyl ethers with tetrafluoroethylene. The homopolymerization or copolymerization is carried out in accordance with procedures such as described in United States Patent 2,952,669, issued to M. I. Bro on September 13, 1960, employing perfluorinated solvents and initiators. Following is an example of such a copolymerization reaction as set forth in copending application Serial Number 71,393.

A 100 cc. stainless steel autoclave fitted with a magnetically driven stirring blade is flushed with nitrogen and evacuated. A solution of 10 grams (0.06 mole) of perfluoromethyl perfluorovinyl ether in 64 cc. of perfluorodimethyl cyclobutane is admitted to the autoclave. The solution is heated to 60° C. and then tetrafluoroethylene is introduced into the autoclave until a pressure of 300 p.s.i.g. is obtained. Approximately $10^{-4}$ mole of $N_2F_2$ diluted with nitrogen is added to the rapidly stirred mixture. The contents of the autoclave are heated with stirring for 45 minutes at 60° C. and then cooled to room temperature and vented to atmospheric pressure. Solid polymer weighing 11.4 grams is obtained. The melt viscosity of the copolymer at 380° C. is $16 \times 10^{-4}$ poises. Infrared analyses of film of the resin pressed at 250° C. and 25,000 pounds platen pressure indicate that the copolymer contains 11.3 weight percent bound perfluoromethyl perfluorovinyl ether. The films of the copolymer are tough, transparent and colorless.

We claim:

1. A process for the preparation of fluorinated vinyl ethers from fluorinated 2-alkoxypropionyl fluorides which comprises the steps of contacting a fluorinated 2-alkoxypropionyl fluoride and a carbonate of a metal selected from Group I–A of the Periodic Chart of the Elements, under anhydrous conditions for about 0.01 to 10 minutes at a temperature of from 75° C. to 300° C., and recovering said fluorinated vinyl ether.

2. A process for the preparation of perfluorovinyl ethers from perfluoro-2-alkoxypropionyl fluorides which comprises the steps of contacting a fluorinated 2-alkoxypropionyl fluoride and a carbonate of a metal selected from Group I–A of the Periodic Chart of the Elements, under anhydrous conditions for from 0.01 to 10 minutes at a temperature of from 75° C. to 300° C., and recovering said perfluorovinyl ether.

3. A process for the preparation of perfluorovinyl ethers from a perfluoro-2-alkoxypropionyl fluoride selected from the group consisting of

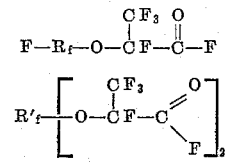

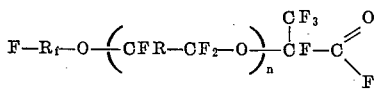

and

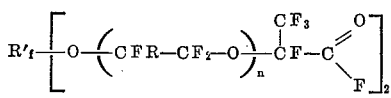

wherein $R_f$ is a perfluoroalkylene radical having 1 to 12 carbon atoms, $R'_f$ is a perfluoroalkylene radical having 2 to 12 carbon atoms, $n$ is an integer from 1 to 20 and R is a radical selected from the group consisting of fluorine and trifluoromethyl, which comprises the steps of contacting said fluoride and a carbonate of a metal selected from Group I-A of the Periodic Chart of the Elements, under anhydrous conditions for about 0.01 to 10 minutes at a temperature of from 75° C. to 300° C., and recovering said perfluorovinyl ether.

4. The process of claim 3 wherein the fluoride and the Group I-A metal carbonate are contacted at a temperature of from 100 to 160° C. in the presence of a polar liquid selected from the class consisting of the dialkyl ethylene glycol ethers and the hydrocarbon nitriles.

5. The process of claim 4 wherein the polar liquid is the dimethyl ether of diethylene glycol.

6. The process of claim 4 wherein the salt is lithium carbonate.

7. The process of claim 4 wherein the salt is sodium carbonate.

8. The process of claim 4 wherein the salt is potassium carbonate.

9. A process for the preparation of perfluorovinyl ethers from perfluoro-2-alkoxypropionyl fluorides which comprises the steps of passing the vapor of a perfluoro-2-alkoxypropionyl fluoride through a fluidized bed of anhydrous lithium carbonate, at a temperature of 200 to 300° C., the quantity of said lithium carbonate being at least stoichiometric with said propionyl fluoride vapor, the contact time of said lithium carbonate and said propionyl fluoride vapor being 0.01 to 10 minutes, and thereafter recovering said perfluorovinyl ether.

10. A process for the preparation of perfluorovinyl ethers from perfluoro-2-alkoxypropionyl fluorides which comprises the steps of passing the vapor of a perfluoro-2-alkoxypropionyl fluoride through a fluidized bed of anhydrous sodium carbonate, at a temperature of 200 to 300° C., the quantity of said sodium carbonate being at least stoichiometric with said propionyl fluoride vapor, the contact time of said sodium carbonate and said propionyl fluoride being 0.01 to 10 minutes, and thereafter recovering said perfluorovinyl ether.

11. A process for the preparation of perfluorovinyl ethers from perfluoro-2-alkoxypropionyl fluorides which comprises the steps of passing the vapor of a perfluoro-2-alkoxypropionyl fluoride through a fluidized bed of anhydrous potassium carbonate, at a temperature of 200 to 300° C., the quantity of said potassium carbonate being at least stoichiometric with said propionyl fluoride vapor, the contact time of said potassium carbonate and said propionyl fluoride being 0.01 to 10 minutes, and thereafter recovering said perfluorovinyl ether.

12. A process for the preparation of perfluorovinyl ethers from a perfluoro-2-alkoxypropionyl fluoride selected from the group consisting of

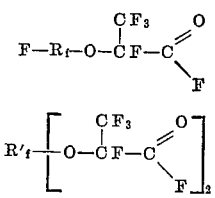

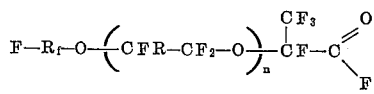

and

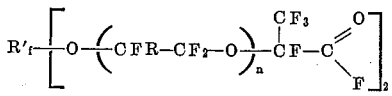

where $R_f$ is a perfluoroalkylene radical having 1 to 12 carbon atoms, $R'_f$ is a perfluoroalkylene radical having 2 to 12 carbon atoms, $n$ is an integer from 1 to 20 and R is a radical selected from the group consisting of fluorine and trifluoromethyl, which comprises the steps of passing the vapor of said fluoride through a fluidized bed of anhydrous lithium carbonate, at a temperature of 200 to 300° C., the quantity of said lithium carbonate being at least stoichiometric with said fluoride vapor, the contact time of said lithium carbonate and said fluoride vapor being 0.01 to 10 minutes, and thereafter recovering said perfluorovinyl ether.

13. A process for the preparation of perfluorovinyl ethers from a perfluoro-2-alkoxypropionyl fluoride selected from the group consisting of

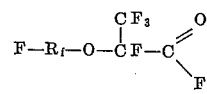

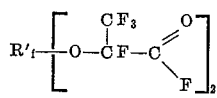

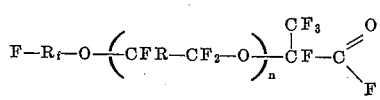

and

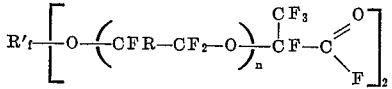

wherein $R_f$ is a perfluoroalkylene radical having 1 to 12 carbon atoms, $R'_f$ is a perfluoroalkylene radical having 2 to 12 carbon atoms, $n$ is an integer from 1 to 20 and R is a radical selected from the group consisting of fluorine and trifluoromethyl, which comprises the steps of passing the vapor of said fluoride through a fluidized bed of anhydrous sodium carbonate, at a temperature of 200 to 300° C., the quantity of said sodium carbonate being at least stoichiometric with said fluoride vapor, the contact time of said sodium carbonate and said fluoride vapor being 0.01 to 10 minutes, and thereafter recovering said perfluorovinyl ether.

14. A process for the preparation of perfluorovinyl ethers from a perfluoro-2-alkoxypropionyl fluoride selected from the group consisting of

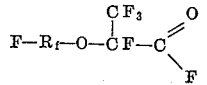

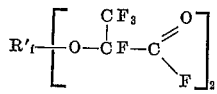

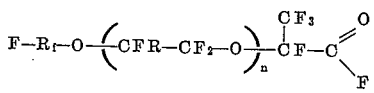

and

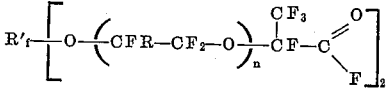

wherein $R_f$ is a perfluoroalkylene radical having 1 to 12 carbon atoms, $R'_f$ is a perfluoroalkylene radical having 2 to 12 carbon atoms, $n$ is an integer from 1 to 20 and R is a radical selected from the group consisting of fluorine and trifluoromethyl, which comprises the steps of passing the vapor of said fluoride through a fluidized bed of anhydrous potassium carbonate, at a temperature of 200 to 300° C., the quantity of said potassium carbonate being at least stoichiometric with said fluoride, the contact time of said potassium carbonate and said fluoride being 0.01 to 10 minutes, and thereafter recovering said perfluorovinyl ether.

References Cited by the Examiner

UNITED STATES PATENTS

| | | | |
|---|---|---|---|
| 3,020,321 | 2/1962 | Gibbs | 260—653.3 |
| 3,114,778 | 12/1963 | Fritz et al. | 260—614 |

LEON ZITVER, *Primary Examiner.*

B. HELFIN, H. T. MARS, *Assistant Examiners.*